United States Patent
Kim et al.

(10) Patent No.: US 11,272,324 B2
(45) Date of Patent: Mar. 8, 2022

(54) METHOD AND APPARATUS FOR RECEIVING MBMS SERVICE ON BASIS OF BEAM

(71) Applicant: LG Electronics Inc., Seoul (KR)

(72) Inventors: Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 16/492,464

(22) PCT Filed: Mar. 7, 2018

(86) PCT No.: PCT/KR2018/002682
§ 371 (c)(1),
(2) Date: Sep. 9, 2019

(87) PCT Pub. No.: WO2018/164471
PCT Pub. Date: Sep. 13, 2018

(65) Prior Publication Data
US 2021/0144516 A1    May 13, 2021

Related U.S. Application Data

(60) Provisional application No. 62/468,948, filed on Mar. 9, 2017.

(51) Int. Cl.
*H04W 4/06* (2009.01)
*H04W 72/04* (2009.01)
*H04W 72/12* (2009.01)

(52) U.S. Cl.
CPC ........... *H04W 4/06* (2013.01); *H04W 72/046* (2013.01); *H04W 72/1273* (2013.01)

(58) Field of Classification Search
CPC ..... H04W 72/005; H04W 16/28; H04W 4/06; H04W 72/02; H04W 72/0413;
(Continued)

(56) References Cited

U.S. PATENT DOCUMENTS 7,180,885 B2    2/2007 Terry
8,879,470 B2    11/2014 Zhang et al.
(Continued)

FOREIGN PATENT DOCUMENTS

CN    101583085    11/2009
CN    102118765    7/2011
(Continued)

OTHER PUBLICATIONS

Chinese Office Action in Chinese Appln. No. 201880026832.7, dated Mar. 9, 2021, 11 pages (with English translation).
(Continued)

*Primary Examiner* — Liton Miah
(74) *Attorney, Agent, or Firm* — Fish & Richardson P.C.

(57) ABSTRACT

Provided are a method for transmitting a multimedia broadcast multicast service (MBMS) interest indication message by a terminal in a wireless communication system and an apparatus for supporting the same. The method may comprise the steps of: receiving MBMS scheduling information from a base station; selecting at least one beam among a plurality of beams; on the basis of the MBMS scheduling information, determining whether an MBMS service of interest is provided via the at least one selected beam; and when the terminal determines that the MBMS service of interest is not provided via the at least one selected beam, transmitting, to the base station, an MBMS interest indication message including the MBMS service of interest and the at least one selected beam.

16 Claims, 10 Drawing Sheets

(58) Field of Classification Search
CPC ... H04W 72/085; H04W 72/14; H04W 76/40; H04W 72/00; H04W 72/12; H04B 7/0695; H04B 7/02
See application file for complete search history.

(56) References Cited

U.S. PATENT DOCUMENTS

| | | | | |
|---|---|---|---|---|
| 10,411,785 | B2* | 9/2019 | Davydov | H04B 7/024 |
| 10,425,200 | B2* | 9/2019 | Islam | H04B 7/0408 |
| 10,757,682 | B2* | 8/2020 | Jang | H04L 65/4076 |
| 10,804,994 | B2* | 10/2020 | Gao | H04W 16/28 |
| 2006/0229082 | A1 | 10/2006 | Terry | |
| 2014/0029580 | A1* | 1/2014 | Jung | H04W 36/08 |
| | | | | 370/331 |
| 2014/0120926 | A1* | 5/2014 | Shin | H04W 56/00 |
| | | | | 455/450 |
| 2016/0044517 | A1 | 2/2016 | Raghavan et al. | |
| 2017/0346534 | A1* | 11/2017 | Islam | H01Q 1/245 |
| 2017/0346544 | A1* | 11/2017 | Islam | H04W 28/0231 |

FOREIGN PATENT DOCUMENTS

| | | |
|---|---|---|
| CN | 102265524 | 11/2011 |
| CN | 102077484 | 10/2013 |
| CN | 105493531 | 4/2016 |
| CN | 103339875 | 10/2016 |
| CN | 106031051 | 10/2016 |
| KR | 20110119831 | 11/2011 |
| KR | 101271033 | 6/2013 |
| WO | WO2010096952 | 9/2010 |
| WO | WO2013051832 | 4/2013 |
| WO | WO2016072792 | 5/2016 |

OTHER PUBLICATIONS

Conggang, "The Research on Multicast Beamforming and D2D Technologies in LTE Trunking System," University of Electronic Science and Technology of China, dated 2013, 95 pages.

Jianguang, "Research on Multicast Beamforming with the Multicell Cooperation for LTE PMR Networks," Harbin Institute of Technology, Jun. 2016, 64 pages.

* cited by examiner

FIG. 3
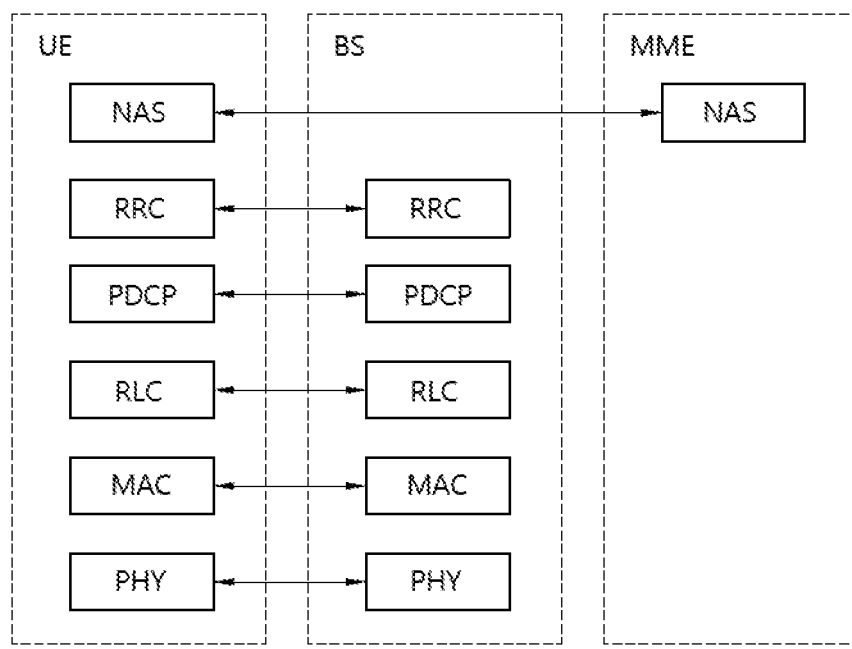
(a)
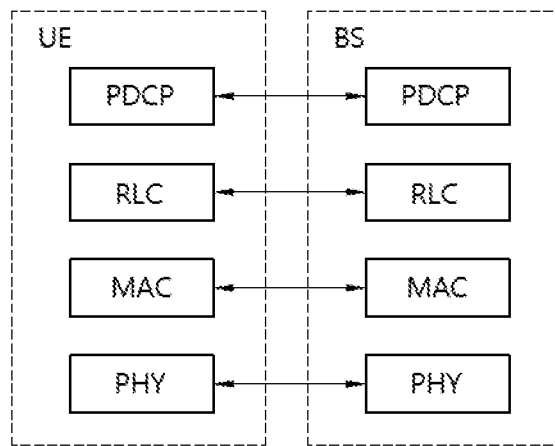
(b)

METHOD AND APPARATUS FOR RECEIVING MBMS SERVICE ON BASIS OF BEAM

CROSS-REFERENCE TO RELATED APPLICATIONS

This application is a National Stage application under 35 U.S.C. § 371 of International Application No. PCT/KR2018/002682, filed on Mar. 7, 2018, which claims the benefit of U.S. Provisional Application No. 62/468,948 filed on Mar. 9, 2017. The disclosures of the prior applications are incorporated by reference in their entirety.

BACKGROUND OF THE INVENTION

Field of the Invention

The present invention relates to a wireless communication system, and more particularly, to a method in which a terminal receives an MBMS service by using a beam, and an apparatus supporting the method.

Related Art

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain are not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

SUMMARY OF THE INVENTION

Meanwhile, a base station may broadcast an MBMS service by using a beam. However, the base station does not have to broadcast the MBMS service by using all beams belonging to the base station, and may broadcast the MBMS service by using only some beams. That is, if the base station knows where a terminal interested in receiving a specific MBMS service is located, MBSFN transmission or SCPTM transmission which uses only a beam corresponding to the specific MBMS service will be sufficient. Accordingly, there is a need to propose a method of providing an MBMS service by using a beam and an apparatus supporting the method.

According to an embodiment, there is provided a method in which a terminal transmits a multimedia broadcast multicast service (MBMS) interest indication message in a wireless communication system. The method may include: receiving MBMS scheduling information from a base station; selecting at least any one beam from among a plurality of beams; determining whether an MBMS service of interest is provided through the selected at least any one beam on the basis of the MBMS scheduling information; and transmitting to the base station an MBMS interest indication message including the MBMS service of interest and the selected at least any one beam, when the terminal determines that the MBMS service of interest is not provided through the selected at least any one beam.

According to another embodiment, there is provided a terminal for transmitting an MBMS interest indication message in a wireless communication system. The terminal may include: a memory; a transceiver; and a processor operatively coupled to the memory and the transceiver. The processor may be configured to: control the transceiver to receive MBMS scheduling information from a base station; select at least any one beam from among a plurality of beams; determine whether an MBMS service of interest is provided through the selected at least any one beam on the basis of the MBMS scheduling information; and control the transceiver to transmit to the base station an MBMS interest indication message including the MBMS service of interest and the selected at least any one beam, when the terminal determines that the MBMS service of interest is not provided through the selected at least any one beam.

An MBMS service can be effectively provided by using a beam.

BRIEF DESCRIPTION OF THE DRAWINGS

FIG. 3 shows a control plane and a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
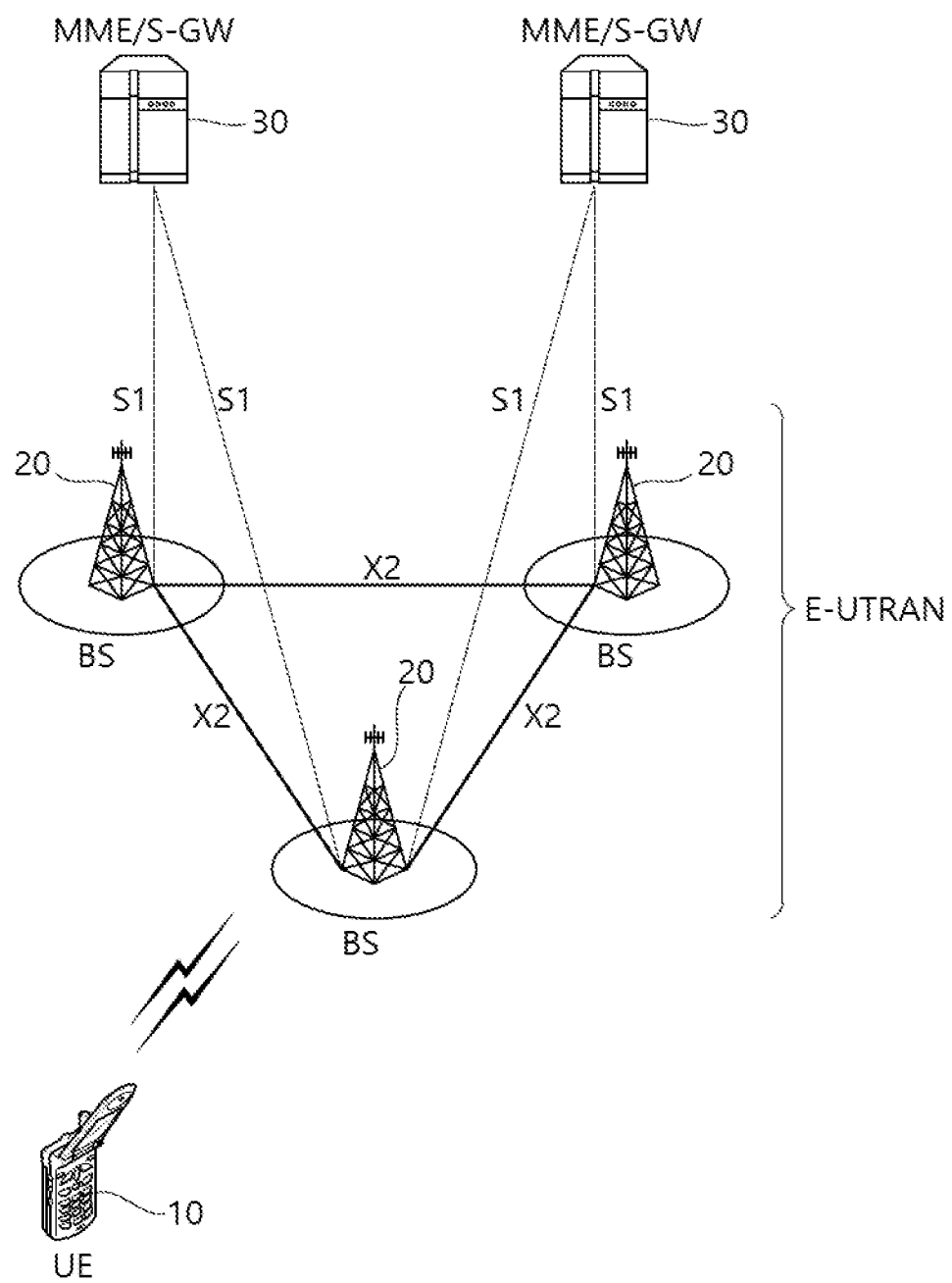
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
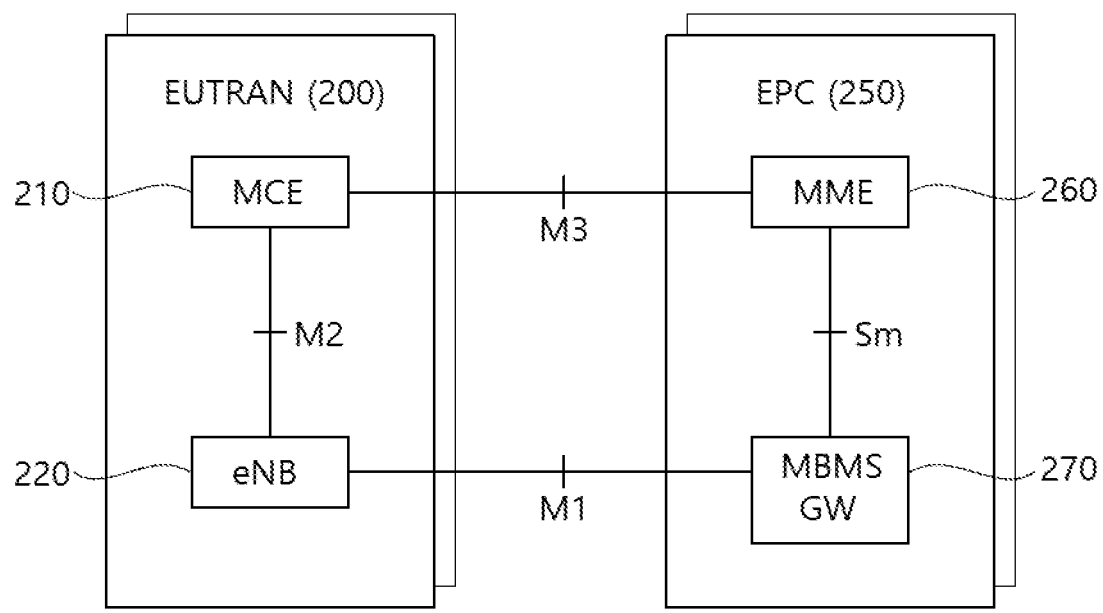
FIG. 2 shows a network architecture for an MBMS.

FIG. 2 shows a network architecture for a Multimedia Broadcast/Multicast Service (MBMS).

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
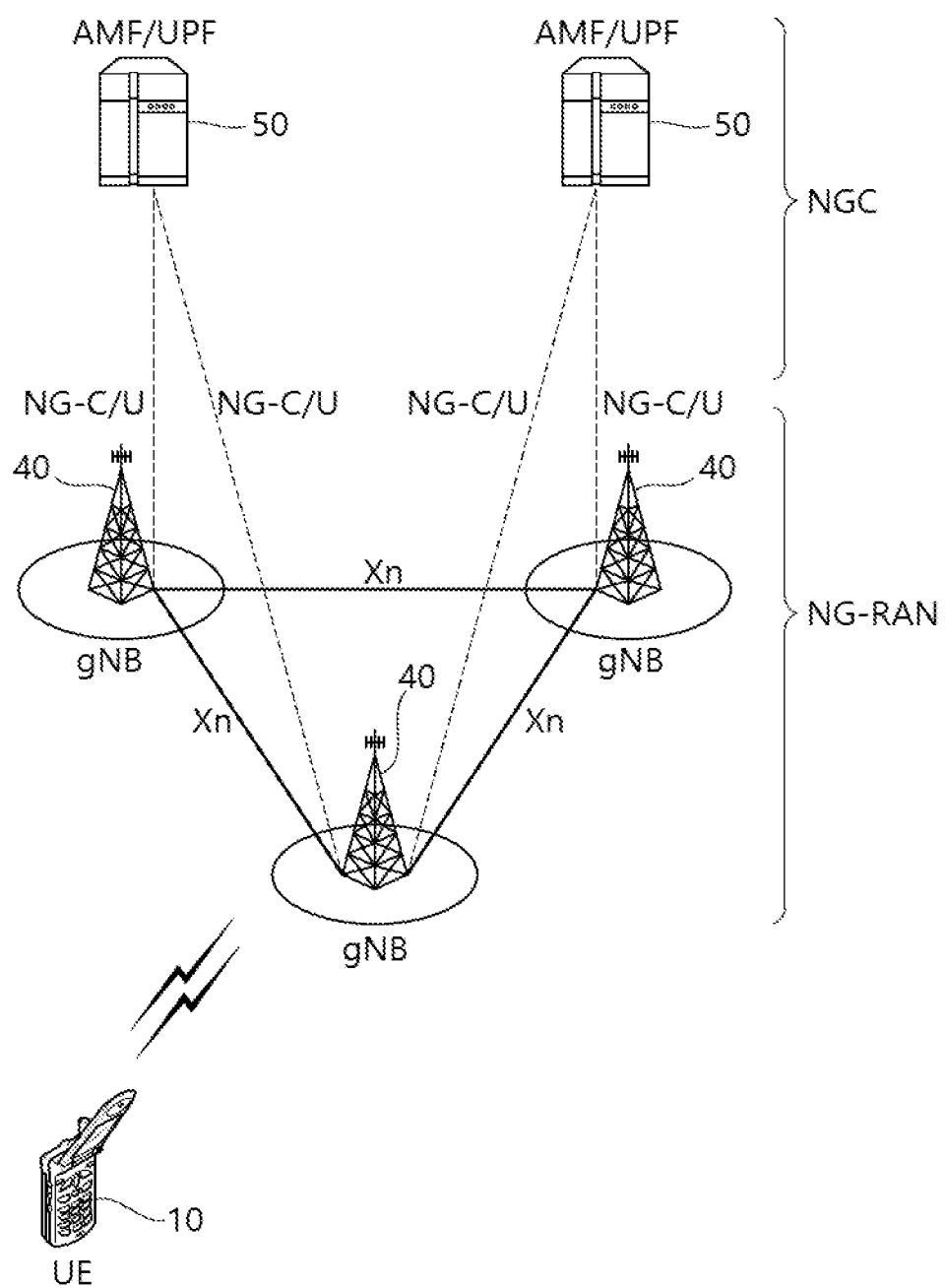
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an MBMS and a multicast/broadcast single frequency network (MBSFN) are described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns a highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned a highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Figure 5:
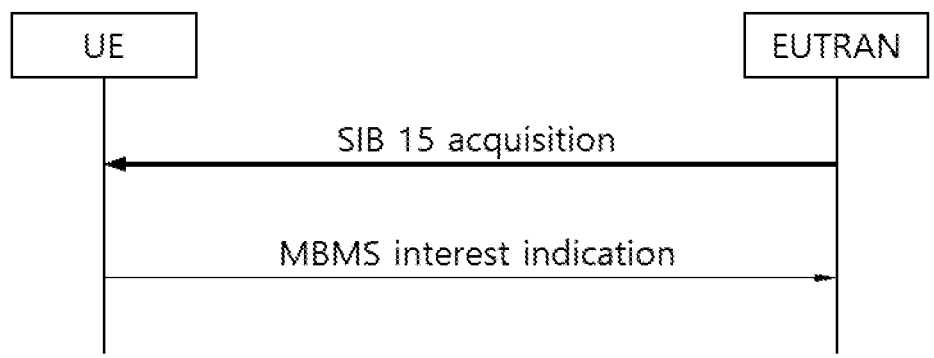
FIG. 5 shows an example of transmitting system information for an MBMS service and an MBMS interest indication message.

FIG. 5 shows an example of transmitting system information for an MBMS service and an MBMS interest indication message.

Referring to FIG. 5, the base station transmits a system information block 15 (SIB15) to the user equipment (or terminal). SIB15 corresponds to system information that is defined for an MBMS service. SIB15 may include MBMS service area identities (SIAs) of the current and/or neighboring carrier frequencies. Table 1 shown below represents an example of the SIB15.

TABLE 1

ASN1START
SystemInformationBlockType15-r11 ::= SEQUENCE {
sai-IntraFreq-r11 MBMS-SAI-List-r11 OPTIONAL, -- Need OR
sai-InterFreqList-r11 MBMS-SAI-InterFreqList-r11 OPTIONAL, -- Need OR
lateNonCriticalExtension OCTET STRING OPTIONAL, -- Need OP
...
}
MBMS-SAI-List-r11 ::= SEQUENCE (SIZE (1..maxSAI-MBMS-r11)) OF MBMS-SAI-r11
MBMS-SAI-r11::= INTEGER (0..65535)
MBMS-SAI-InterFreqList-r11 ::= SEQUENCE (SIZE (1..maxFreq)) OF MBMS-SAI-InterFreq-r11
MBMS-SAI-InterFreq-r11 ::= SEQUENCE {
dl-CarrierFreq ARFCN-ValueEUTRA,
sai-List-r11 MBMS-SAI-List-r11,
...
}
-- ASN1STOP In Table 1, the sai-IntraFreq field includes a list of MBMS service area identities of the carrier frequency to which the user equipment is currently accessing (or attached). The sai-InterFreqList field includes a list of neighboring frequencies providing an MBMS service and a corresponding list of MBMS service area identities. The sai-List field includes a list of MBMS service area identities for a specific frequency.

The user equipment, which is in a RRC connected state, transmits an MBMS interest indication message to the base station through an MBMS point to multipoint radio bearer (MRB). The user equipment may notify the frequency from which the user equipment is receiving an MBMS service, or the frequency providing the MBMS service, which the user equipment is interested in receiving (hereinafter referred to as an MBMS service of interest), to the base station through the MBMS interest indication message. The user equipment may also notify the frequency from which the user equipment is no longer receiving an MBMS service, or the frequency providing the MBMS service, which the user equipment is no longer interested in receiving (hereinafter referred to as an MBMS service of no interest), to the base station through the MBMS interest indication message. Additionally, the user equipment may notify whether or not it prioritizes the reception of the MBMS service over a unicast reception through the MBMS interest indication message. The MBMS interest indication message may be transmitted through a dedicated control channel (DCCH). A signaling radio bearer (SRB) for the MBMS interest indication message corresponds to SRB1, and the MBMS interest indication message may be transmitted based on a verification mode. Table 2 shown below represents an example of the MBMS interest indication message.

TABLE 2

ASN1START
MBMSInterestIndication-r11 ::= SEQUENCE {
criticalExtensions CHOICE {
c1 CHOICE {
interestIndication-r11 MBMSInterestIndication-r11-IEs,
spare3 NULL, spare2 NULL, spare1 NULL
},
criticalExtensionsFuture SEQUENCE { }
}
}
MBMSInterestIndication-r11-IEs ::= SEQUENCE {
mbms-FreqList-r11 CarrierFreqListMBMS-r11 OPTIONAL,
mbms-Priority-r11 ENUMERATED {true} OPTIONAL,
lateNonCriticalExtension OCTET STRING OPTIONAL,
nonCriticalExtension SEQUENCE { } OPTIONAL
}
-- ASN1STOP In Table 2, the mbms-FreqList field indicates a list of frequencies from which the user equipment is receiving an MBMS service, or frequencies providing MBMS services, which the user equipment is interested in receiving (hereinafter referred to as MBMS services of interest). The mbms-Priority field indicates whether or not the user equipment prioritizes an MBMS service reception over a unicast reception. In case the user equipment prioritizes the reception of all frequencies providing the MBMS services over the reception of a unicast bearer, the value of the mbms-Priority field may be 'True'. If not, the mbms-Priority field may be omitted.

The base station, which has received the MBMS interest indication message, may be aware that the user equipment is interested in shifting (or relocating) to a cell that is operated by a frequency providing an MBMS service. The base station may handover the user equipment to a cell of a specific frequency, which provides a specific MBMS service, and, after the handover of the user equipment, the base station allows the user equipment to be capable of easily receiving the MBMS service. Additionally, in case the user equipment is handed over from a first base station to a second base station, the first base station may deliver the MBMS interest indication message, which is received from the user equipment, to the second base station through an MBMS UE context. More specifically, the user equipment is not required to transmit the MBMS interest indication message one more time to the second base station. Even after the user equipment is handed over to the second base station, the second base station may allow the user equipment to be capable of continuously receiving the MBMS service easily.

Hereinafter, a Single-Cell Point-to-Multipoint (SCPTM) transmission will be described in detail.

The method for transmitting an MBMS service includes an SCPTM transmission and a Multimedia Broadcast multicast service Single Frequency Network (MBSFN) transmission. The MBSFN transmission transmits a signal that can be simultaneously identified by a plurality of cells, whereas the SCPTM transmission transmits an MBMS service from a single cell. Therefore, unlike the MBSFN transmission, inter-cell synchronization is not required in the SCPTM transmission. Additionally, unlike the MBSFN transmission, since the SCPTM transmission uses the conventional PDSCH without any modification, the SCPTM transmission has the characteristics of a unicast. More specifically, a plurality of user equipments reads the same PDCCH and acquires an RNTI for each service, so as to receive the SCPTM service. An SCPTM-dedicated MCCH was adopted, and, when the user equipment determines that the service it wishes to receive corresponds to an SCPTM service through the MCCH, the user equipment acquires the corresponding RNTI value. And, by reading the PDCCH through the corresponding RNTI, the user equipment may receive the SCPTM service.

Meanwhile, a BS (e.g., gNB) may broadcast an MBMS service by using a beam. However, the BS does not have to broadcast the MBMS service by using all beams belonging to the BS, and may broadcast the MBMS service by using only some beams. That is, if the BS knows where a UE interested in receiving a specific MBMS service is located, MBSFN transmission or SCPTM transmission which uses only a beam corresponding to the specific MBMS service will be sufficient. Hereinafter, according to an embodiment of the present invention, a method of providing an MBMS service by using a beam and an apparatus supporting the method will be described.

Figure 6:
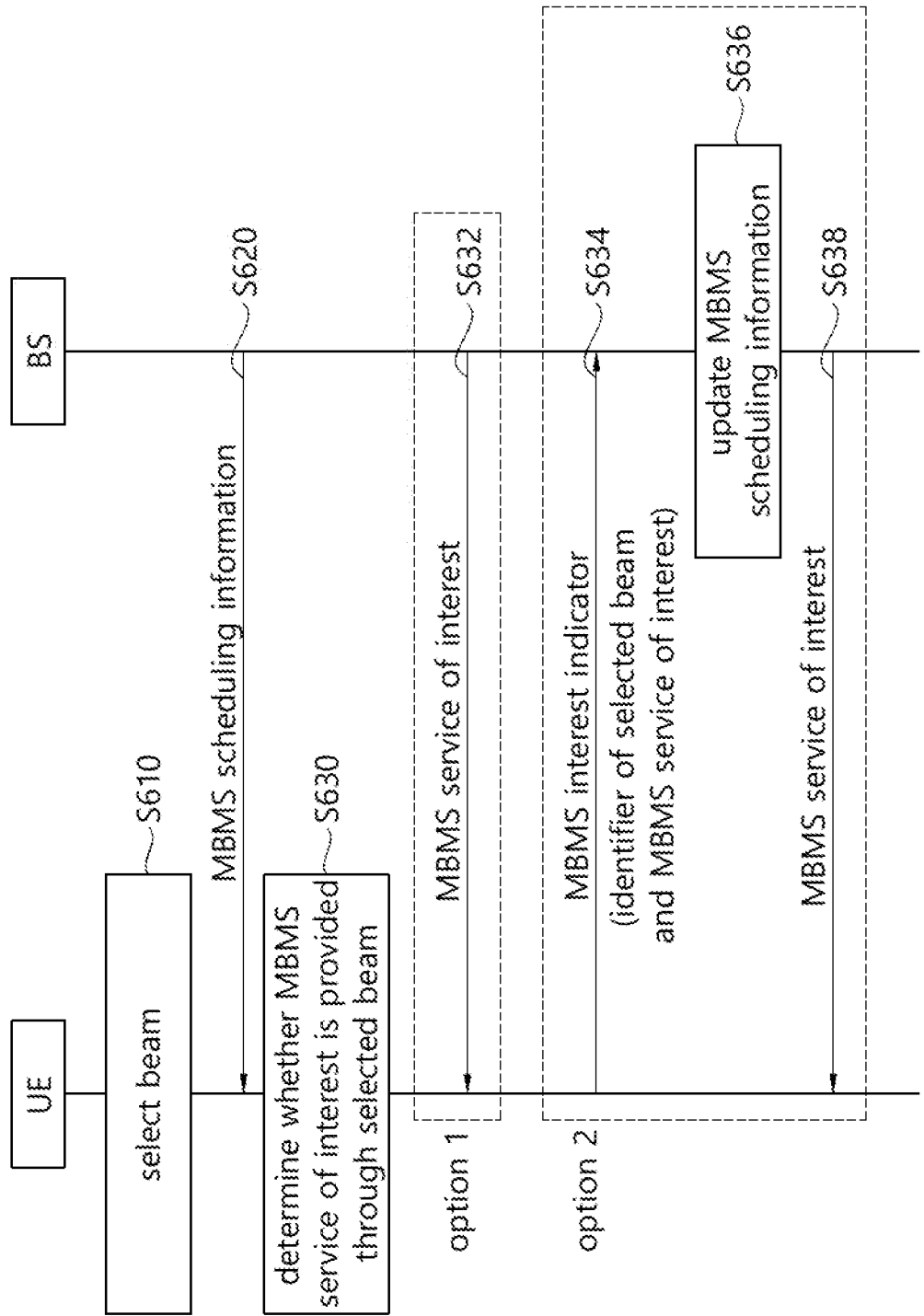
FIG. 6 shows a procedure for providing an MBSM service by using a beam according to an embodiment of the present invention.

FIG. 6 shows a procedure for providing an MBSM service by using a beam according to an embodiment of the present invention.

Referring to FIG. 6, in step S610, a UE may select a beam. The UE may be a UE which desires to receive an MBMS service through broadcasting. The MBMS service may be received through MBSFN transmission or SCPTM transmission. The selected beam may be a beam having best signal quality measured by the UE among a plurality of beams belonging to the BS. Alternatively, the selected beam may be one or more beams having best signal quality among the plurality of beams belonging to the BS. For example, the selected beam may be one or more beams having signal quality greater than or equal to a threshold among the plurality of beams belonging to the BS. In the present specification, one beam having best signal quality may be referred to as a best beam, and one or more beams having good signal quality may be referred to as suitable beams.

In step S620, the UE may receive MBMS scheduling information. In the present specification, the MBMS scheduling information may be referred to as MBMS service scheduling information. A network may broadcast the MBMS scheduling information by using all beams belonging to the network. The MBMS scheduling information may include beam scheduling information (i.e., which beam is used to transmit the MBMS service). That is, the MBMS scheduling information may include information for the MBMS service and information for a beam for providing the MBMS service. Preferably, the MBMS scheduling information may be received through the best beam. Alternatively, the MBMS scheduling information may be received through the suitable beam.

In step S630, on the basis of the MBMS scheduling information, the UE may determine whether an MBMS service of interest (i.e., an MBMS service to be received) is provided through a selected beam.

If at least any one of an identifier of the best beam and an identifier of the suitable beam is included in MBMS scheduling information corresponding to the MBMS service of interest, in step S632, the UE may receive the MBMS service of interest by using a beam included in the MBMS scheduling information.

Otherwise, in step S634, the UE may notify the identifier of the best beam and/or suitable beam for the MBMS service to the network. The best beam and/or suitable beam for the MBMS service may be notified through an MBMS interest indication message or a measurement report message. The message may include an identifier of the selected beam and the MBMS service of interest. If the UE is in an RRC state (e.g., RRC_CONNECTED state or an RRC_ACTIVE state) supporting uplink transmission, the UE may transmit to the BS the MBMS interest indication message or the measurement report message in a corresponding RRC state. If the UE is in an RRC state (e.g., RRC_IDLE state) not supporting uplink transmission, the UE may transition to the RRC state supporting uplink transmission and thereafter transmit to the BS the MBMS interest indication message or the measurement report message in the transitioned RRC state. Thereafter, in step S636, the BS may update the MBMS scheduling information on the basis of the message. In addition, in step S638, the UE may receive the MBMS service of interest on the basis of the updated MBMS scheduling information.

Figure 7:
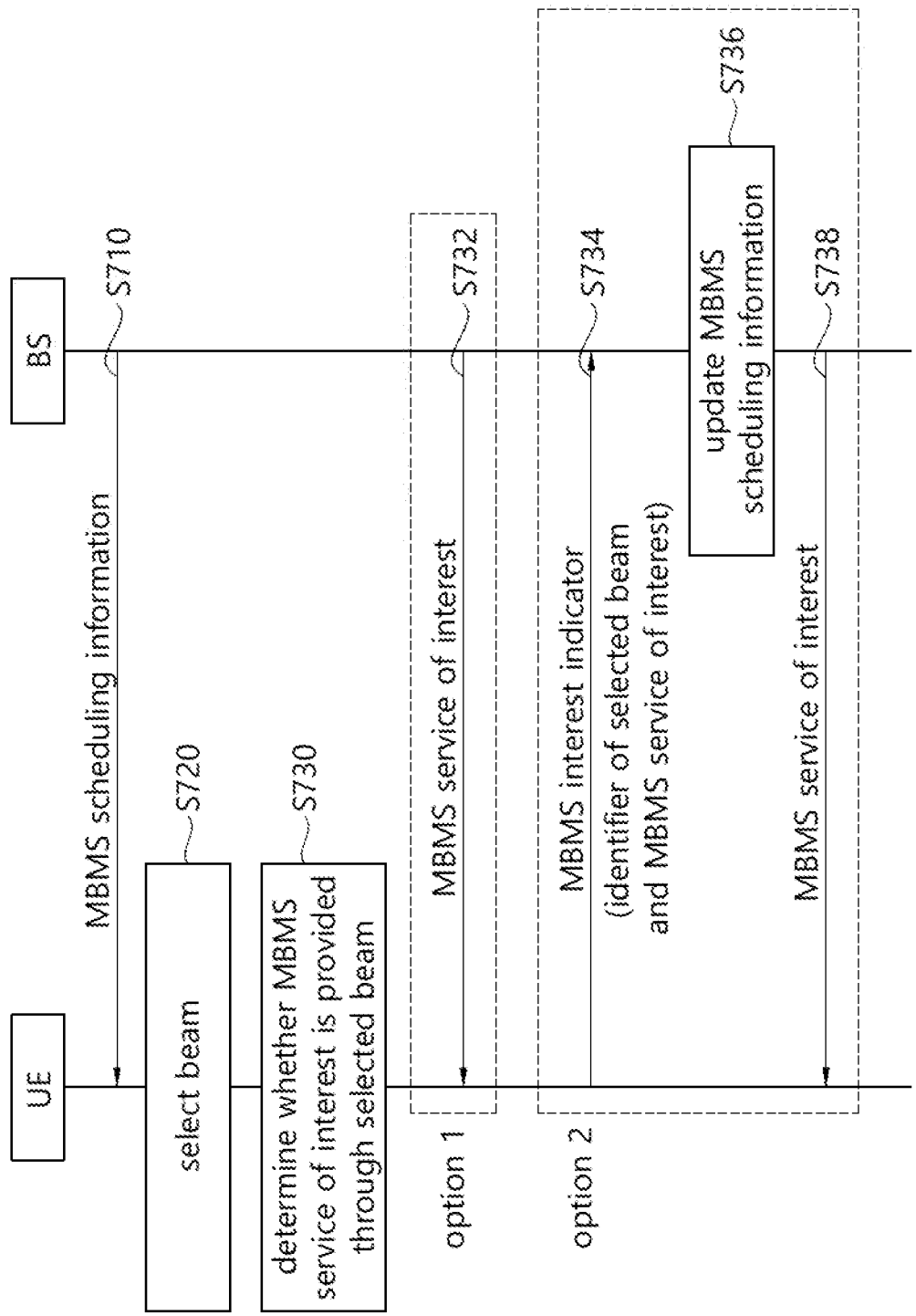
FIG. 7 shows a procedure for providing an MBMS service by using a beam according to an embodiment of the present invention.

FIG. 7 shows a procedure for providing an MBMS service by using a beam according to an embodiment of the present invention.

Referring to FIG. 7, in step S710, a UE may receive MBMS scheduling information. The UE may be a UE which desires to receive an MBMS service through broadcasting. The MBMS service may be received through MBSFN transmission or SCPTM transmission. The MBMS scheduling information may be received through a best beam. The MBMS scheduling information may include a threshold used for a beam suitability check. The beam suitability check may be a check for selecting a suitable beam.

The UE may measure quality for a plurality of beams which are subjected to sweeping by a network. If a quality measurement result for the beam exceeds a threshold included in the MBMS scheduling information, in step S720, the UE may determine a corresponding beam as a suitable beam, and may select the corresponding beam. Accordingly, there may be a plurality of suitable beams unlike the best beam. The suitable beam may be a beam having quality sufficient to receive the MBMS service.

In step S730, on the basis of the MBMS scheduling information, the UE may determine whether an MBMS service of interest (i.e., an MBMS service to be received) is provided through a selected beam.

If an identifier of the suitable beam is included in MBMS scheduling information corresponding to the MBMS service of interest, in step S732, the UE may receive the MBMS service of interest by using a beam included in the MBMS scheduling information.

Otherwise, in step S734, the UE may notify the identifier of the suitable beam for the MBMS service to the network. The suitable beam for the MBMS service may be notified through an MBMS interest indication message or a measurement report message. The message may include the identifier of the selected beam and the MBMS service of interest. If the UE is in an RRC state (e.g., RRC_CONNECTED state or an RRC_ACTIVE state) supporting uplink transmission, the UE may transmit to the BS the MBMS interest indication message or the measurement report message in a corresponding RRC state. If the UE is in an RRC state (e.g., RRC_IDLE state) not supporting uplink transmission, the UE may transition to the RRC state supporting uplink transmission and thereafter transmit to the BS the MBMS interest indication message or the measurement report message in the transitioned RRC state. Thereafter, in step S736, the BS may update the MBMS scheduling information on the basis of the message. In addition, in step S738, the UE may receive the MBMS service of interest on the basis of the updated MBMS scheduling information.

Figure 8:
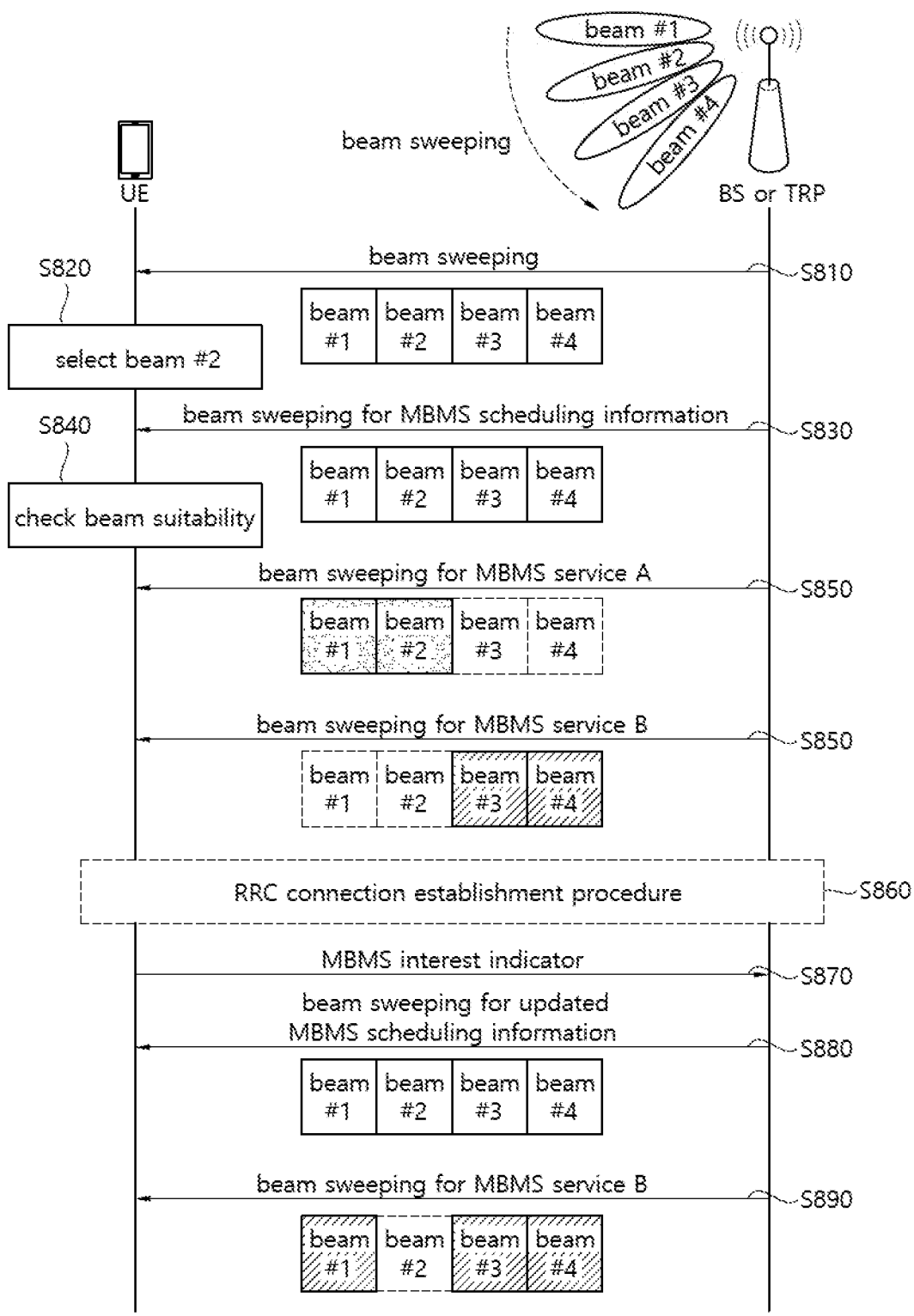
FIG. 8 shows a procedure for providing an MBMS service by using a beam according to an embodiment of the present invention.

FIG. 8 shows a procedure for providing an MBMS service by using a beam according to an embodiment of the present invention.

Referring to FIG. 8, in step S810, a BS may transmit a plurality of beams in a beam sweeping period. The beam sweeping period may be a period in which the BS fully or partially sweeps an antenna beam of the BS. The BS may be a gNB or a transmission and reception point (TRP). Different beams may be transmitted with different time intervals. For example, the different beams may be transmitted in different subframes or different symbols by using a beam reference signal (BSR).

In step S820, a UE may receive different beams at different time intervals to measure quality of the respective beams. In addition, the UE may select a best beam which provides highest measurement quality among all beams. Alternatively, the UE may select one or more beams of which measured quality exceeds a threshold. Alternatively, the UE may select one or more beams of which measured quality is greater than or equal to a threshold. In the embodiment of FIG. 8, it is assumed that the UE selects a beam #2, and regards the beam #2 as a serving beam.

In step S830, the BS may transmit MBMS scheduling information through all beams. The MBMS scheduling information may include beam scheduling information (i.e., which beam is used and which MBMS service is transmitted using the beam). In addition, the MBMS scheduling information may include a threshold for selecting a suitable beam. The UE may receive the MBMS scheduling information through the serving beam (i.e., the beam #2). In the embodiment of FIG. 8, it is assumed that the MBMS scheduling information indicates that an MBMS service A is transmitted through a beam #1 and the beam #2, and indicates that an MBMS service B is transmitted through a beam #3 and a beam #4.

In step S840, the UE may use the threshold included in the MBMS scheduling information to check beam suitability for MBMS reception. That is, the UE may select one or more suitable beams of which beam quality exceeds the threshold (or greater than or equal to the threshold). In the embodiment of FIG. 8, it is assumed that the UE is interested in receiving the MBMS service A and the MBMS service B, and the UE regards the beam #1 and the beam #2 as a suitable beam for receiving the MBMS service.

In step S850, the BS may broadcast the MBMS service A through the beam #1 and the beam #2, and may broadcast the MBMS service B through the beam #3 and the beam #4. Accordingly, the UE may receive the MBMS service A through the suitable beam #2 or beam #1. However, the MBMS service B is provided through the beam #3 and the beam #4, and the beam #3 and the beam #4 are not suitable beam. Therefore, the UE may not attempt to receive the MBMS service B.

In step S860, the UE may enter an RRC_CONNECTED state or an RRC_ACTIVE state in order to transmit an MBMS interest indication message to a network. If the UE is already in the RRC_CONNECTED state or the RRC_ACTIVE state, step S860 may be omitted.

In step S870, the UE may transmit the MBMS interest indication message which indicates an MBMS service of interest and a suitable beam of the UE. An identifier of the suitable beam may be indicated in an ascending order. For example, in the embodiment of FIG. 8, the UE may transmit the MBMS interest indication message indicating an identifier of the beam #1, an identifier of the beam #2, the MBMS service A, and the MBMS service B. In addition, since quality of the beam #2 is better than quality of the beam #1 with respect to the UE, the MBMS interest indication message may include the identifiers of the beams in order of the beam #2 and the beam #1. Accordingly, the BS which has received the MBMS interest indication message may regard a beam included first (i.e., the beam #2) as a best beam for transmitting the MBMS service with respect to the UE. Preferably, a suitable beam ID may be reported to the network on an MBMS frequency basis.

In step S880, in order to allow the UE to be able to receive the MBMS service B, the BS may broadcast the MBMS service B through the beam #1, the beam #3, and the beam #4, and may transmit updated MBMS scheduling information.

After transmitting the MBMS interest indication message, in step S890, the UE may acquire again updated MBMS scheduling information to receive the MBMS service B, and may check updated beam information for the MBMS service B. In addition, the UE may receive the MBMS service B through the beam #1.

According to an embodiment of the present invention, the BS may provide a specific MBMS service to the UE by using only some beams among a plurality of beams belonging to the BS.

Figure 9:
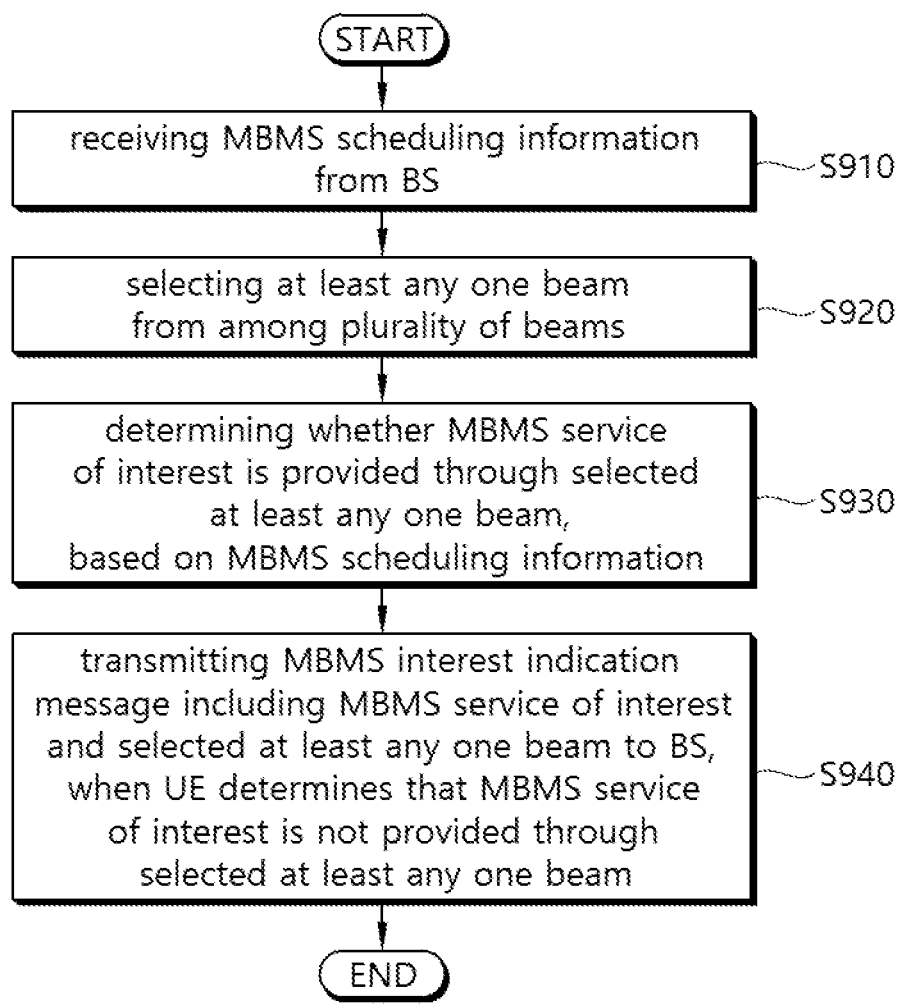
FIG. 9 is a block diagram showing a method in which a user equipment transmits an MBMS interest indication message according to an embodiment of the present invention.

FIG. 9 is a block diagram showing a method in which a UE transmits an MBMS interest indication message according to an embodiment of the present invention.

Referring to FIG. 9, in step S910, a UE may receive MBMS scheduling information from a BS. The MBMS scheduling information may be received from the BS through a beam having best signal quality measured by the UE among the plurality of beams. The MBMS scheduling information may include a threshold for selecting a suitable beam for MBMS reception.

In step S920, the UE may select at least any one beam from among the plurality of beams. The at least any one beam may be a beam of which signal quality measured by the UE exceeds the threshold among the plurality of beams.

In step S930, the UE may determine whether an MBMS service of interest is provided through the selected at least any one beam on the basis of the MBMS scheduling information;

In step S940, when the UE determines that the MBMS service of interest is not provided through the selected at least any one beam, the UE may transmit to the BS an MBMS interest indication message including the MBMS service of interest and the selected at least any one beam. When the MBMS scheduling information corresponding to the MBMS service of interest does not include an identifier of the selected at least any one beam, the UE may determine that the MBMS service of interest is not provided through the selected at least any one beam. The MBMS interest indication message may indicate the selected at least any one beam orderly from good signal quality measured by the UE.

When the UE determines that the MBMS service of interest is provided through the selected at least any one beam, the UE may receive the MBMS service of interest through the selected at least any one beam.

In addition, the UE may receive updated MBMS scheduling information from the BS in response to the MBMS interest indication message. The updated MBMS scheduling information may be updated by the BS on the basis of the MBMS interest indication message. The updated MBMS scheduling information may be received from the BS through a beam having best signal quality measured by the UE among the plurality of beams. In addition, the UE may receive the MBMS service of interest through the selected at least any one beam on the basis of the updated MBMS scheduling information.

Figure 10:
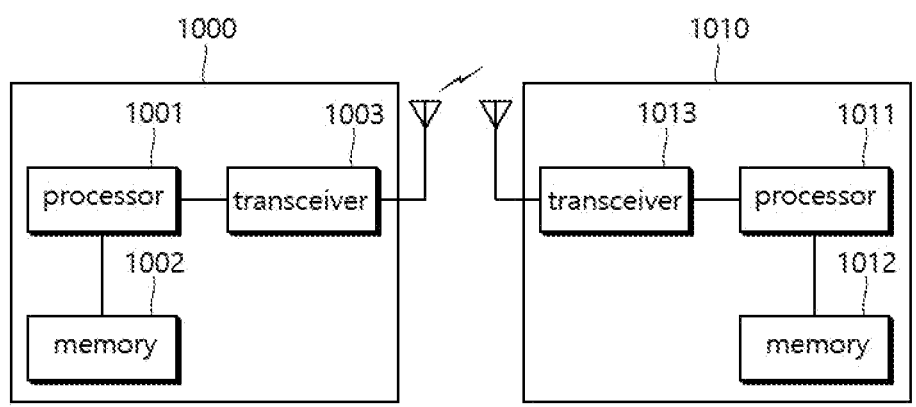
FIG. 10 is a block diagram illustrating a wireless communication system according to the embodiment of the present invention.

FIG. 10 is a block diagram illustrating a wireless communication system according to the embodiment of the present invention.

ABS 1000 includes a processor 1001, a memory 1002 and a transceiver 1003. The memory 1002 is connected to the processor 1001, and stores various information for driving the processor 1001. The transceiver 1003 is connected to the processor 1001, and transmits and/or receives radio signals. The processor 1001 implements proposed functions, processes and/or methods. In the above embodiment, an operation of the BS may be implemented by the processor 1001.

A UE 1010 includes a processor 1011, a memory 1012 and a transceiver 1013. The memory 1012 is connected to the processor 1011, and stores various information for driving the processor 1011. The transceiver 1013 is connected to the processor 1011, and transmits and/or receives radio signals. The processor 1011 implements proposed functions, processes and/or methods. In the above embodiment, an operation of the UE may be implemented by the processor 1011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method in which a terminal transmits a multimedia broadcast multicast service (MBMS) interest indication message in a wireless communication system, the method comprising:
   receiving MBMS scheduling information from a base station;
   selecting at least one beam from among a plurality of beams;
   determining whether an MBMS service of interest is provided through the at least one beam based on the MBMS scheduling information; and
   transmitting, to the base station, an MBMS interest indication message including the MBMS service of interest and the selected at least one beam, based on the terminal determining that the MBMS service of interest is not provided through the selected at least one beam.

2. The method of claim 1, further comprising receiving updated MBMS scheduling information from the base station in response to the MBMS interest indication message.

3. The method of claim 2, wherein the updated MBMS scheduling information is updated by the base station based on the MBMS interest indication message.

4. The method of claim 2, wherein the updated MBMS scheduling information is received from the base station through a beam having best signal quality measured by the terminal among the plurality of beams.

5. The method of claim 2, further comprising receiving the MBMS service of interest through the selected at least one beam based on the updated MBMS scheduling information.

6. The method of claim 1, wherein the MBMS scheduling information is received from the base station through a beam having best signal quality measured by the terminal among the plurality of beams.

7. The method of claim 1, wherein the MBMS scheduling information includes a threshold for selecting a suitable beam for MBMS reception.

8. The method of claim 7, wherein the at least one beam is a beam of which signal quality measured by the terminal exceeds the threshold among the plurality of beams.

9. The method of claim 1, wherein the MBMS interest indication message indicates the selected at least one beam orderly from good signal quality measured by the terminal.

10. The method of claim 1, wherein, based on the MBMS scheduling information related to the MBMS service of interest not include an identifier of the selected at least one beam, the terminal determines that the MBMS service of interest is not provided through the selected at least one beam.

11. The method of claim 1, further comprising receiving the MBMS service of interest through the selected at least one beam, based on the terminal determining that the MBMS service of interest is provided through the selected at least one beam.

12. The method of claim 1, wherein the terminal communicates with at least one of a mobile terminal, a network or autonomous vehicles other than the terminal.

13. A terminal for transmitting a multimedia broadcast multicast service (MBMS) interest indication message in a wireless communication system, the terminal comprising:
a memory; a transceiver; and a processor operatively coupled to the memory and the transceiver, wherein the processor is configured to:
control the transceiver to receive MBMS scheduling information from a base station;
select at least one beam from among a plurality of beams;
determine whether an MBMS service of interest is provided through the selected at least one beam based on the MBMS scheduling information; and
control the transceiver to transmit to the base station an MBMS interest indication message including the MBMS service of interest and the selected at least one beam, based on the terminal determining that the MBMS service of interest is not provided through the selected at least one beam.

14. The terminal of claim 13, wherein the processor controls the transceiver to receive updated MBMS scheduling information from the base station in response to the MBMS interest indication message.

15. The terminal of claim 14, wherein the processor controls the transceiver to receive the MBMS service of interest through the selected at least one beam based on the updated MBMS scheduling information.

16. The terminal of claim 13, wherein the processor controls the transceiver to receive the MBMS service of interest through the selected at least one beam, based on the terminal determining that the MBMS service of interest is provided through the selected at least one beam.

* * * * *